(12) United States Patent
Liu et al.

(10) Patent No.: US 8,879,208 B1
(45) Date of Patent: Nov. 4, 2014

(54) UMBRELLA SHIELD WRITER (UMSW) DESIGN FOR PERPENDICULAR MAGNETIC RECORDING (PMR)

(71) Applicant: Headway Technologies, Inc., Milpitas, CA (US)

(72) Inventors: Yue Liu, Fremont, CA (US); Yaguang Wei, Pleasanton, CA (US); Yuhui Tang, Milpitas, CA (US); Moris Dovek, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 14/093,969

(22) Filed: Dec. 2, 2013

(51) Int. Cl.
*G11B 5/127* (2006.01)

(52) U.S. Cl.
USPC ...................................... 360/125.3

(58) Field of Classification Search
CPC ............. G11B 5/40; G11B 5/11; G11B 5/127
USPC ............... 360/125.3, 125.03, 125.09, 125.04, 360/125.17, 125.12, 125.16, 125.06, 360/125.15, 125.26, 125.31, 123.1, 123.11
See application file for complete search history.

(56) References Cited

U.S. PATENT DOCUMENTS

| 7,450,349 | B2 | 11/2008 | Nishida et al. |
| 7,675,716 | B2 | 3/2010 | Kagami et al. |
| 7,875,371 | B2 | 1/2011 | Arai et al. |
| 8,149,537 | B2 * | 4/2012 | Nazarov ...................... 360/125.3 |
| 2011/0063755 | A1 * | 3/2011 | Bai et al. .................. 360/123.12 |

* cited by examiner

*Primary Examiner* — Allen T Cao (74) *Attorney, Agent, or Firm* — Saile Ackerman LLC; Stephen B. Ackerman (57) ABSTRACT

An umbrella shield (UmS) is included as the uppermost magnetic layer in a trailing shield design in a read/write head to reduce stray field effects, lower bit error rate, and improve protrusion profile for better touch down detection. The UmS may be exposed or recessed from an air bearing surface (ABS), and has a cross-track width, down-track thickness, and length toward a back side that is greater than the corresponding width, thickness, and length dimensions of an underlying PP3 trailing shield. UmS may substantially conform to an arched PP3 shield shape or may be a flat layer. An insulation layer with a thickness of at least 0.3 microns is formed between the UmS and PP3 trailing shield to prevent undesirable coupling. The UmS preferably has a width greater than any other shield in the read/write head.

29 Claims, 8 Drawing Sheets

UMBRELLA SHIELD WRITER (UMSW) DESIGN FOR PERPENDICULAR MAGNETIC RECORDING (PMR)

TECHNICAL FIELD

The present disclosure relates to the insertion of an umbrella shield above the trailing shield and the write pole in PMR write and read head structures wherein the umbrella shield may be exposed at the air bearing surface (ABS) or recessed with a flat, conformal, or angle shape to improve stray field robustness of a PMR write head, and in narrow writers, reduces stray field effects on writer performance and improves the protrusion profile to enable better touch down detection.

BACKGROUND

Perpendicular recording has been developed in part to achieve higher recording density than is realized with longitudinal recording devices. A PMR write head typically has a main pole layer with a small surface area at an ABS, and coils that conduct a current and generate a magnetic flux in the main pole that exits through a write pole tip and enters a magnetic media (disk) adjacent to the ABS. The flux is used to write a selected number of bits in the magnetic media and typically returns through a shield structure to a back gap region that connects the main pole with the return shield. In some cases, the return shield may also serve as the top shield in a read head that is formed below the write head in a combined read-write structure. A PMR head which combines the features of a single pole writer and a double layered media (magnetic disk) has a great advantage over LMR in providing higher write field, better read back signal, and potentially much higher areal density.

Perpendicular magnetic recording has become the mainstream technology for disk drive applications beyond 150 Gbit/in$^2$. As the demand for slim drives based on PMR head technology has increased, stray field robustness (SFR) or external field robustness (EFR) becomes more and more important when considering the use of an aluminum cover/base to reduce both thickness and weight for the device. Besides the traditional EFR issue, the edge of the writer or reader shield near the ABS may cause erasure when an external field is applied. The SFR issue is associated with poor writing, asymmetry writing, and/or pole erasure (PE) that can cause on-track bit error rate (BER) loss and servo erasure when a stray field is applied.

Besides, with the growing demand for cloud storage and cloud-based network computing, high and ultra high data rate recording becomes important for high-end disk drive applications. It is essential to design a PMR writer that can achieve optimum high data rate performance without sacrificing thermo-mechanical (T/M), adjacent track and wide area erasure (ATE/WATE), and stray field or external field robustness (SFR/EFR) requirements.

For high data rate performance, a compact writer with smaller dimensions in both yoke length and ABS width is a preferred direction. However, small writer protrusion profile associated with a small/compact writer is not favored from a T/M point of view due to delayed writer touch down (TD) detection. This result may cause writer wearing and related reliability issues. Furthermore, when the ABS width of a writer is reduced, EFR at the edge of the reader shield may become worse as external field overloads towards the wider reader shield side unless the reader shield shrinks accordingly. Thus, greater flexibility in the write shield structure and better control of stray field effects are needed to accommodate a smaller write pole width while improving EFR and SFR to a level that is characteristic of wider ABS width writers.

Reducing the magnetic spacing from read/write heads to the magnetic media during both writing and reading is another important factor in achieving better performance in high density recording. The writer and reader are separated by several microns in a typical recording head and are made of several different materials each having a unique coefficient of thermal expansion (CTE). Therefore, the protrusion of the reader and writer are usually quite different due to the effect of varying operating temperatures, applying dynamic flying height (DFH) power to actuate the reader or writer, or from write current excitation. In addition, the point with minimum spacing to disk could be located away from either the reader or the writer, imposing further restrictions to achievable magnetic spacing during reading and writing. Improvements in PMR head design are needed to control the protrusion differences at the writer, the reader and the minimum point, and its variation. In particular, for the touchdown and then back off mode of operation using DFH, writer protrusion should be as close as possible to the reader protrusion to improve touch down detection.

SUMMARY

The fundamental objective of the present disclosure is to provide an improved shield design that can be applied to all types of PMR heads including writers and readers in order to achieve improved stray field robustness (SFR) and better external field robustness (EFR).

Another objective of the present disclosure is to provide an improved shield design according to the first objective that also leads to improved protrusion profile for better writer touch down detection and greater PMR writer reliability, especially for advanced PMR writers with reduced yoke length and ABS width.

The aforementioned objectives are achieved by adding an additional shield called an umbrella shield above a trailing shield in a PMR writer. Thus, the umbrella shield is on the opposite side of the trailing shield with respect to the main pole layer and write pole. The PMR writer may have a combined read head/write head configuration. According to a first embodiment, the umbrella shield has a shape that substantially conforms to an arched PP3 trailing shield in the write head structure. Preferably, there is an insulation layer at least 0.3 microns thick formed between the umbrella shield (UmS) and PP3 shield in order to prevent strong coupling between the shield elements. The umbrella shield has a thickness in a down-track direction that is about 1.1 to 3× that of the PP3 thickness. The UmS layer has a cross-track width greater than the width of PP3 at the ABS, and extends a greater distance towards the back end of the PMR writer than PP3. In one aspect, a front side of the UmS layer is exposed along the ABS. In an alternative design, the front side of UmS may be recessed from the ABS by a distance up to 1.5 microns.

According to a second embodiment, the umbrella shield may be formed as a flat or planar layer that is essentially parallel to a top surface of the main pole layer and aligned orthogonal to the ABS. The same dimensional aspects in terms of thickness, cross-track width, and length towards a writer back end as described above apply in this case. A minimum separation distance of 0.3 microns between the PP3 shield and UmS should be maintained as mentioned previously. The planar UmS design also comprises an exposed front side at the ABS, or a recessed front side that may be aligned at an angle with respect to the ABS.

With regard to the exposed (non-recessed) front side configuration in the first and second embodiments, the front side may be connected by two sides to a back side of UmS wherein the two sides are aligned essentially orthogonal to the ABS, and the back side is parallel to the ABS and has substantially the same width in a cross-track direction as the front side. However, from a top-down view along the down-track direction, the exposed front side configuration may further include two tapered sides that are connected to first and second ends of the front side and extend to an orthogonal side at a first distance from the ABS. In one aspect, the underlying PP3 shield has substantially the same shape as the UmS shield. Preferably, the distance between the two orthogonally aligned UmS sides is greater than the distance between the two orthogonally aligned PP3 sides. Likewise, the distance between the ABS and back side of UmS is preferably greater than the distance between the ABS and a back side of PP3. In other words, the UmS top surface overlaps the sides of PP3 and has a greater cross-track width than any write or read shield in the PMR writer.

In other embodiments related to the recessed front side configuration, the recessed front side is parallel to the ABS and connects to two orthogonal sides or to two tapered sides as described previously. According to another embodiment, the recessed front side that is formed a first distance from the ABS is replaced by two sloped sides that each have a first end at an intersection with an orthogonal side, and a second end at a center point that is a first distance (d1) from the ABS. Each of the sloped sides forms an angle $\alpha$ of about 0.1 to 20 degrees with the ABS. Each intersection is located a second distance (d2) from the ABS where d2>d1.

DETAILED DESCRIPTION

The present disclosure relates to an additional magnetic shield called an umbrella shield (UmS) formed above a trailing shield and main pole layer in a write head. The write head may be part of a combined read head/write head structure. Although the exemplary embodiments depict a PMR writer, the improved shield design described herein is also beneficial in reducing SFR/EFR and improving protrusion profile in a thermal assisted magnetic recording (TAMR) device. The drawings are provided by way of example and are not intended to limit the scope of the disclosure. For example, the UmS layer disclosed herein is anticipated to be compatible with other write head structures and coil designs such as 2 T and 4 T configurations without sacrificing the advantages associated with the exemplary embodiments. Furthermore, one or more heating elements to control reader/writer protrusion profile may be located in one or more insulation layers within a combined read head/write head structure of the present disclosure as appreciated by those skilled in the art.

Figure 1:
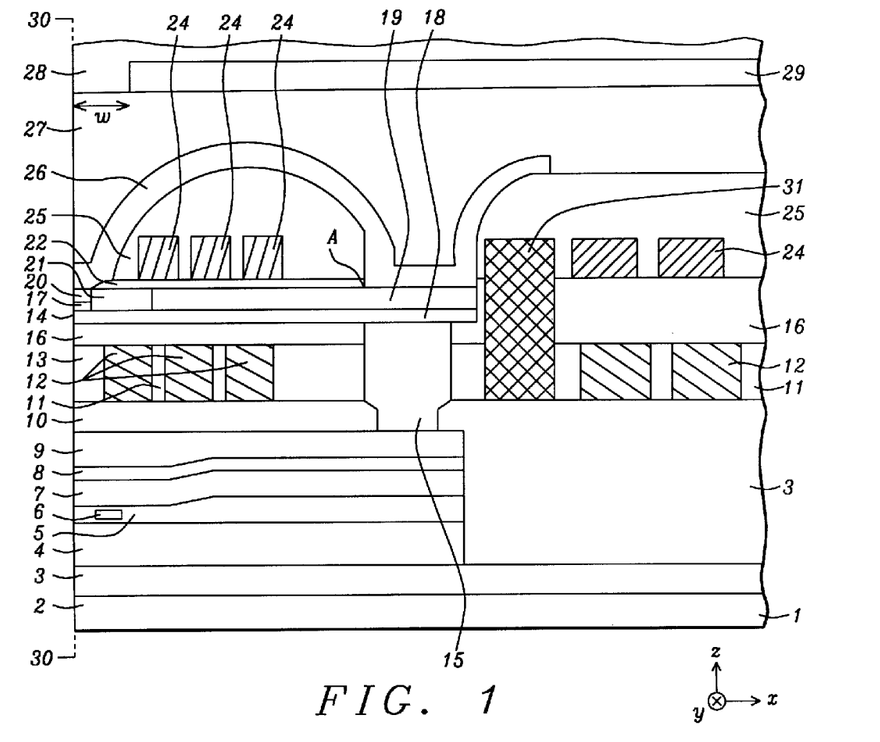
FIG. 1 is a cross-sectional view showing a read/write head structure with a 3 T Coil1 and Coil2 configuration according to a current process of record as practiced by the inventors.

Referring to FIG. 1, a combined read head/write head structure currently fabricated by the inventors is depicted in a cross-sectional view from a plane that is orthogonal to an air bearing surface (ABS) 30-30. The z-axis represents a down-track direction, the y-axis is a cross-track direction, and the x-axis is orthogonal to the ABS and extends toward a back end of the recording device. The combined read head/write head is formed on a substrate 1 that may be comprised of AlTiC (alumina+TiC). Those skilled in the art will recognize that layers 2-9 represent the read head portion of the recording device while layers 9-31 represent the write head portion. The substrate is typically part of a slider (not shown) formed in an array of sliders on a wafer. After the read head/write head is completed, the wafer is sliced to form rows of sliders. Each row is typically lapped to afford an ABS before dicing to fabricate individual sliders that are used in magnetic recording devices.

The present disclosure anticipates that one or more dynamic fly height heater elements (not shown) may be formed in one or more insulation layers in the combined read head/write head structure to control the extent of thermal expansion (protrusion) along the ABS toward a magnetic medium (not shown). Read gap (RG) and write gap (WG) protrusion may be tuned by the choice of metal or alloy selected for the DFH elements since each resistor material has a particular thermal and mechanical response to a given electrical input.

A first insulation layer 2 that may be comprised of alumina or another dielectric material is disposed on substrate 1. There is a second insulation layer 3 formed on the first insulation layer and behind the read head layers 4-9. Above layer 2 is the S1 shield 4 that is comprised of NiFe or CoFeNi or the like, and extends from the ABS toward a back end of the read head. A read gap 5 is formed between the S1 shield 4 and S2A shield 7. A magnetoresistive element or sensor 6 is formed in the read gap 5 along the ABS 30-30 and typically includes a plurality of layers (not shown) in which two ferromagnetic layers are separated by a non-magnetic layer. The magnetic moment direction in one of the ferromagnetic layers is fixed and provides a reference direction, and the moment direction in the other ferromagnetic layer may be rotated by the magnetic field from the media. Resistance across the read gap changes as the moment in the second ferromagnetic layer rotates. A "0" or "1" magnetic state can be defined depending on whether the two ferromagnetic layers are magnetically aligned in the same direction or in an anti-parallel fashion. The non-magnetic layer in the sensor 6 may be comprised of Cu in a giant magnetoresistive (GMR) sensor, or may be an insulator such as alumina or MgO in a tunneling magnetoresistive (TMR) sensor.

A first top shield (S2A) layer 7, insulation layer 8, and second top shield (S2B) layer 9 are formed sequentially on the read gap 5. Top shield layers 7, 9 may be made of the same magnetic material as in the S1 shield 4. Insulation layer 8 may be the same dielectric material as in insulation layer 2. Note that the S2B layer 9 may serve as a flux return pole in the write head portion of the combined read head/write head.

The present disclosure encompasses various configurations of a write head structure that is employed with the read head portion. In the exemplary embodiment, there is an insulation layer 10 formed on the S2B shield layer 9 and between the ABS 30-30 and a back gap connection 15. Coil1 also known as bucking coil 12 is disposed on insulation layer 10 and is wound in series with an opposite polarity to that in Coil 2 also known as the driving coil 24 to minimize direct coupling between the trailing shield 20 and driving coil. A 3+3 T coil design with three turns in each of the coils 12, 24 below and above the main pole layer 18 is depicted although a different number of coil turns such as well known 2 T or 4 T designs may be used. An insulation layer 11 that is typically comprised of a photoresist layer separates bucking coil turns from each other. The front of bucking coil layer 12 closest to the ABS 30-30 may be coplanar with an insulation layer 13 that is formed along the ABS. Top surfaces of insulation layers 11, 13 and bucking coil layer 12 are coplanar in this embodiment. Insulation layers 10, 11, 13 are comprised of a dielectric layer and bucking coil layer is typically a conductive material such as Cu. The back gap connection 15 may be made of CoFeNi or the like and magnetically couples the main pole layer 18 to the S2B shield layer 9. In an alternative embodiment, the back gap connection may be omitted and the trailing shield serves as the only return pole.

An insulation layer 16 is formed on insulation layers 11, 13 and on bucking coil layer 12 and a first section extends from the ABS 30-30 to the back gap connection 15. Both of the insulation layers 11, 16 have a second section on the opposite side of the back gap connection 15 with respect to the ABS. Above the insulation layer 16 is a main pole layer 18 that may be comprised of CoFeNi or another magnetic material. Main pole layer 18 has a write pole tip 14 at the ABS 30-30 and extends toward the back end of the device with a sufficient length to connect with back gap connection 15. A first write shield layer 20 has a bottom surface formed on a write gap 17 at the ABS and extends a throat height distance (not shown) away from the ABS 30-30 to a front side of non-magnetic layer 21. The first write shield layer 20 also known as the first trailing shield may be made of CoFeN, CoFeNi, NiFe, or CoFe, for example, and may be coplanar with the non-magnetic layer 21. The trailing shield functions as a flux return pole and is magnetically coupled to the main pole through a second trailing shield portion named PP3 26. There is a yoke 19 which is formed on the main pole layer 18 and serves to transmit magnetic flux to the main pole layer where the flux is concentrated at the write pole tip 14. Yoke length is defined as the distance from the ABS to point A where yoke 19 touches the inner corner of PP3. There is an insulation layer 22 formed on a portion of the non-magnetic layer 21 and yoke 19. Passing a current through the driving coil layer 24 that is disposed on the insulation layer 22 generates magnetic flux in the yoke 19 and in the main pole layer. The driving coil layer 24 may have a plurality of turns but only three turns are depicted above the main pole layer in this embodiment. The bucking coil layer is connected to driving coil layer through connector 31.

First trailing shield 20 is separated from write pole tip 14 at the ABS by a write gap 17 that is made of an insulation material. Trailing shield layer 26 referred to as PP3 is formed on trailing shield 20 along the ABS and on an insulation layer 21 that extends to a front side of the yoke. PP3 arches over the first three turns in driving coil layer 24 and connects with the top surface of the yoke 19 in a region overlying the back gap connection 15. An insulation layer 25 is formed on the insulation layer 22 and fills the openings between the turns of driving coil layer 24 and the space between the driving coil and the arched PP3 shield layer 26. A protection layer 27 covers PP3 and is made of an insulating material such as alumina. Above the protection layer and recessed a certain distance from the ABS 30-30 is an optional cover layer 29 that is preferably comprised of a low CTE material such as SiC that serves to reduce the WG protrusion rate. The SiC cover layer is recessed to avoid introducing a material at the ABS with different mechanical and etch resistance properties than adjacent layers which could adversely affect back end lapping and ion beam etching processes. An overcoat layer 28 is formed between the SiC cover layer 29 and ABS 30-30 and on the top surface of the SiC layer.

Figure 2:
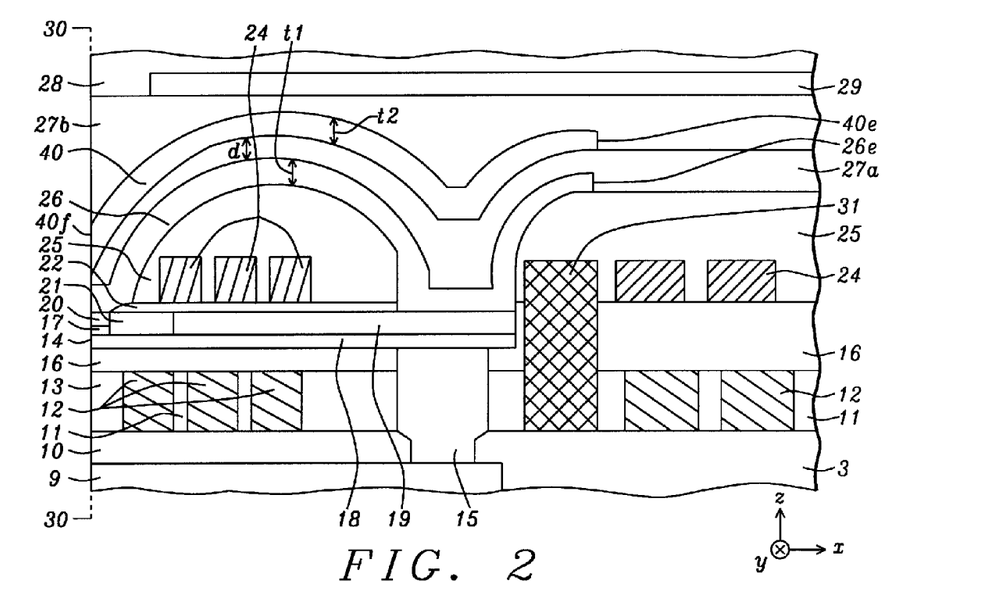
FIG. 2 is a cross-sectional view of a PMR writer that has a conformal umbrella shield structure according to a first embodiment of the present disclosure.

Referring to FIG. 2, a first embodiment of the present disclosure is illustrated and comprises a write head structure similar to the one shown in FIG. 1 except that an additional shield layer (UmS) 40 is included that is substantially conformal with respect to a top surface of PP3 26. It should be understood that the separation distance d between UmS and PP3 may not be exactly the same in all regions of the write head, especially near the ABS and behind the PP3 arch where d could be smaller than in a region above driving coil 24. Thus, insulation layer 27a with a minimum thickness of 0.3 microns separates UmS and PP3 in order to prevent strong magnetic coupling between the two shield elements. There is also an insulation layer 27b on layers 27a, 40 that is deposited after UmS is formed as described in a later section. The umbrella shield is comprised of a magnetic material such as NiFe, CoFe, or CoFeNi and may have the same composition as PP3. However, other magnetic alloys are acceptable. A front side 40f of the umbrella shield is exposed at the ABS while a back end 40e is formed a greater distance from the ABS than a back end 26e of PP3. For example, back end 40e may be about 1 to 5 microns farther away from ABS 30-30 than back end 26e.

Figure 10A:
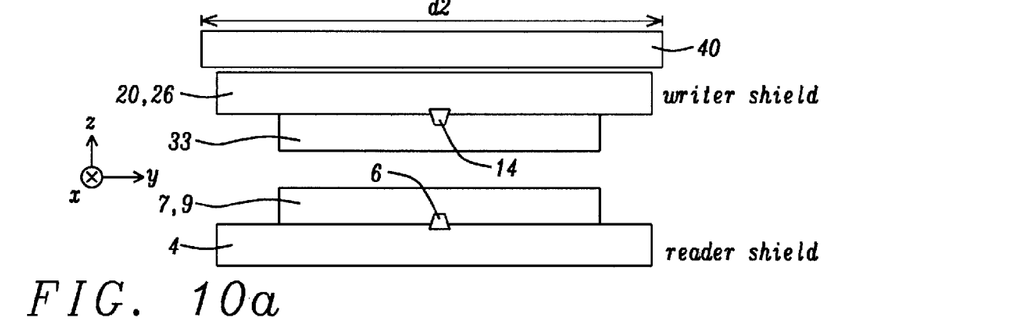
FIG. 10a, FIG. 12a, and FIG. 14a are ABS views of combined read/write head structures wherein an exposed umbrella shield is incorporated into the design of FIG. 9, FIG. 11, and FIG. 13, respectively.
Figure 12A:
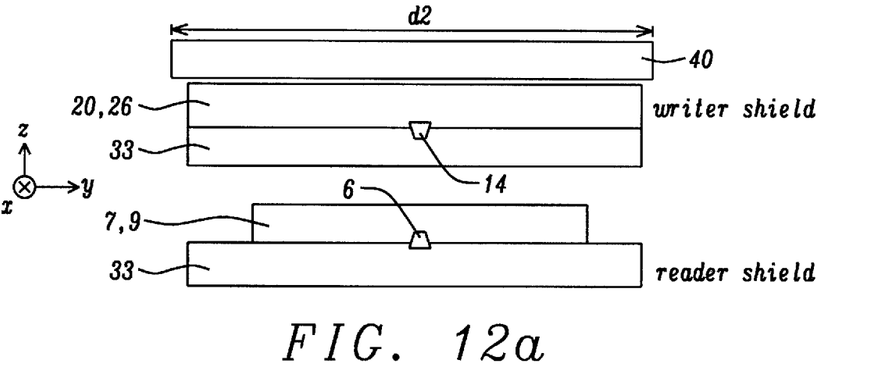
Figure 14A:
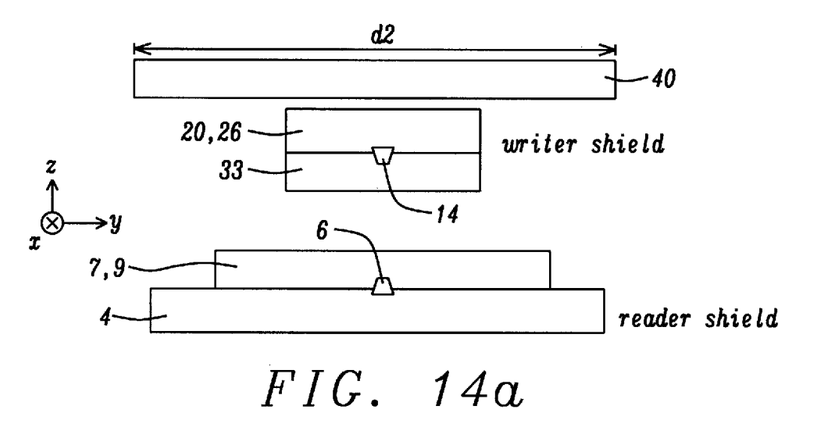

Preferably, the umbrella shield has a uniform thickness t2 that is from 1.1 to 3 times greater than the thickness t1 of PP3. As indicated in FIG. 10a, FIG. 12a, and FIG. 14a, the width of an exposed UmS is at least 1 to 5 microns wider than the largest cross-track shield dimension used in the reader shields and writer shields. As a result, when an external or stray field is applied, UmS 40 will absorb a large portion of the magnetic field and thereby deflect a significant portion of stray field from reaching the functional head (reader and writer). In other words, the umbrella shield is acting like a dummy shield to reduce stray field and external field effects on the write head and read head, and thereby improve SFR/EFR. More-over, since UmS has a higher CTE than the portion of insulation layer 27 (layers 27a, 27b) it displaced, the writer protrusion at the ABS is likely to be greater in the portion of writer above PP3. As a result, writer protrusion along the ABS will be more uniform thereby enabling better touch down detection than in the prior art.

Figure 3:
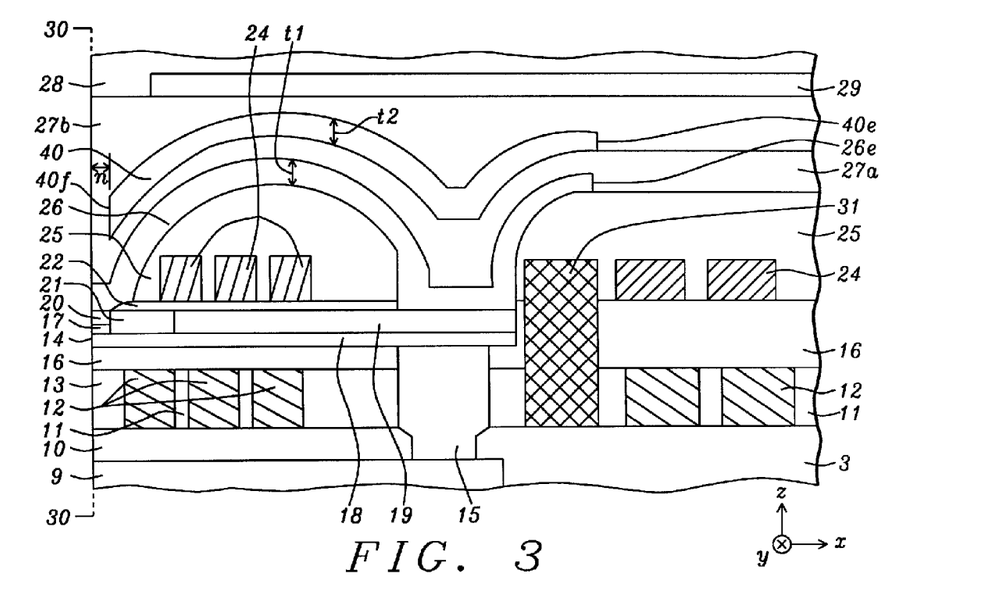
FIG. 3 is a cross-sectional view of a PMR writer that has a conformal recessed umbrella shield according to a second embodiment of the present disclosure.
Figure 10B:
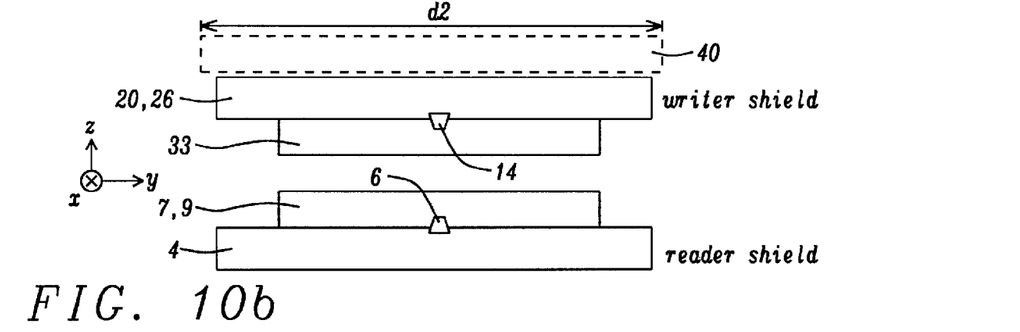
FIG. 10b, FIG. 12b, and FIG. 14b are ABS views of combined read/write head structures wherein a recessed umbrella shield is incorporated into the design of FIG. 9, FIG. 11, and FIG. 13, respectively.
Figure 12B:
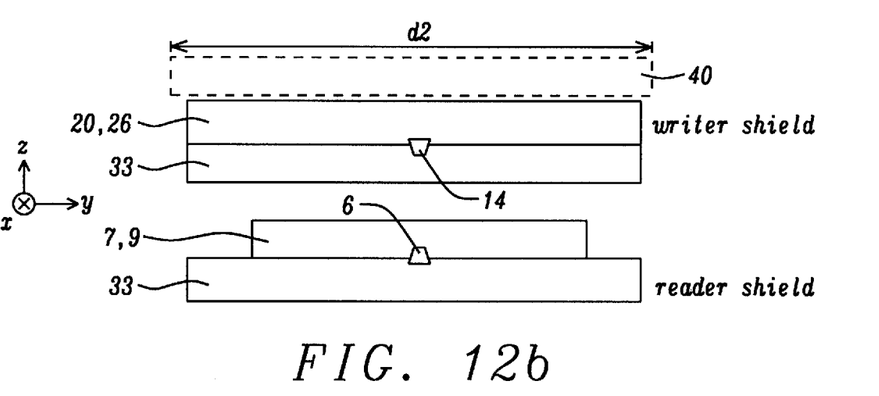
Figure 14B:
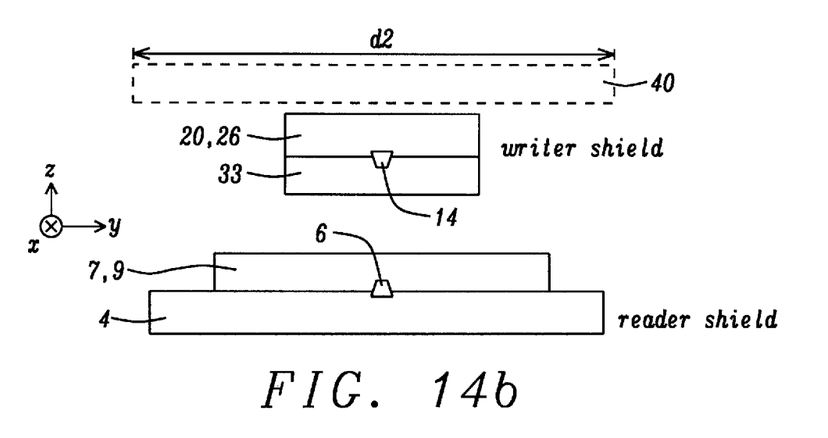

In FIG. 3, a second embodiment is depicted that features a conformal UmS similar to that in the first embodiment. However, front side 40f of the umbrella shield is recessed a distance n of 0.2 to 1.5 microns from the ABS. A recessed UmS structure is employed when there is a need to keep metal from being exposed above the PP3 shield. For example, in certain fabrication schemes, it may be necessary to avoid introducing a material at the ABS with different mechanical and etch resistance properties than in adjacent insulation layers which could adversely affect back end lapping and ion beam etching processes. As described in a later section, a non-recessed UmS is preferred from a standpoint of greater effectiveness in reducing stray field and external field effects on the PMR head. As indicated in FIG. 10b, FIG. 12b, and FIG. 14b, the width of a recessed UmS is at least 1 to 5 microns wider than the largest cross-track dimension used in the reader shields and writer shields. Accordingly, when an external field or stray field is applied, UmS 40 will absorb a large portion of the magnetic field and prevent a significant portion of stray field from reaching the functional head (reader/writer).

Figure 4:
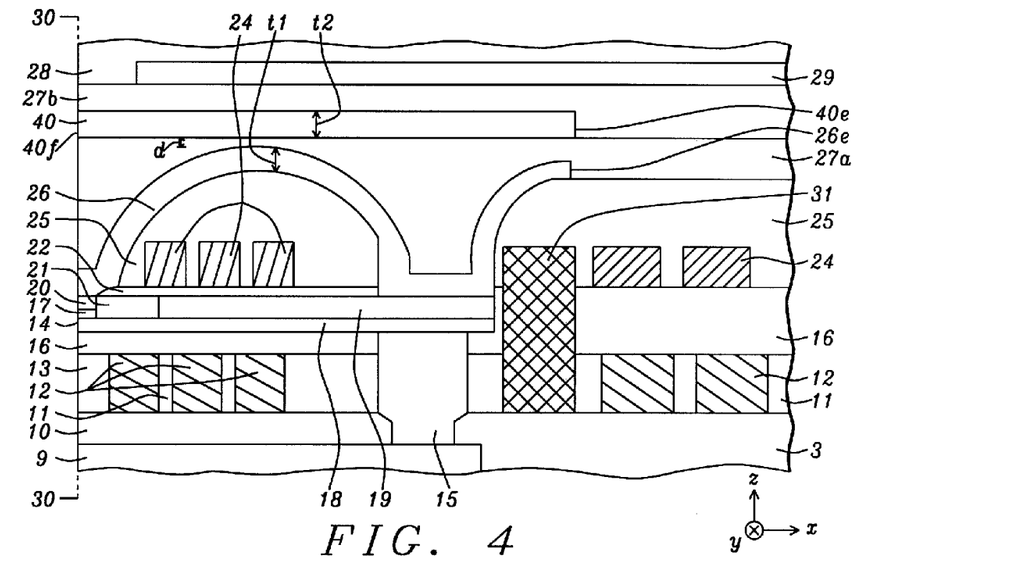
FIG. 4 is a cross-sectional view of a PMR writer that has a flat umbrella shield structure according to a third embodiment of the present disclosure.

With regard to a third embodiment depicted in FIG. 4, the umbrella shield 40 may be a flat layer with a planar top surface formed with a chemical mechanical polish (CMP) process that is well known in the art. The planar UmS retains the features of the conformal type with respect to a thickness t2 that is larger than t1 of PP3, and a back end 40e that is a greater distance from the ABS than back end 26e of PP3. Furthermore, there is preferably a minimum separation distance d of 0.3 microns or more between UmS and PP3. As shown in FIG. 4, front side 40f of the umbrella shield is exposed at the ABS 30-30.

Figure 5:
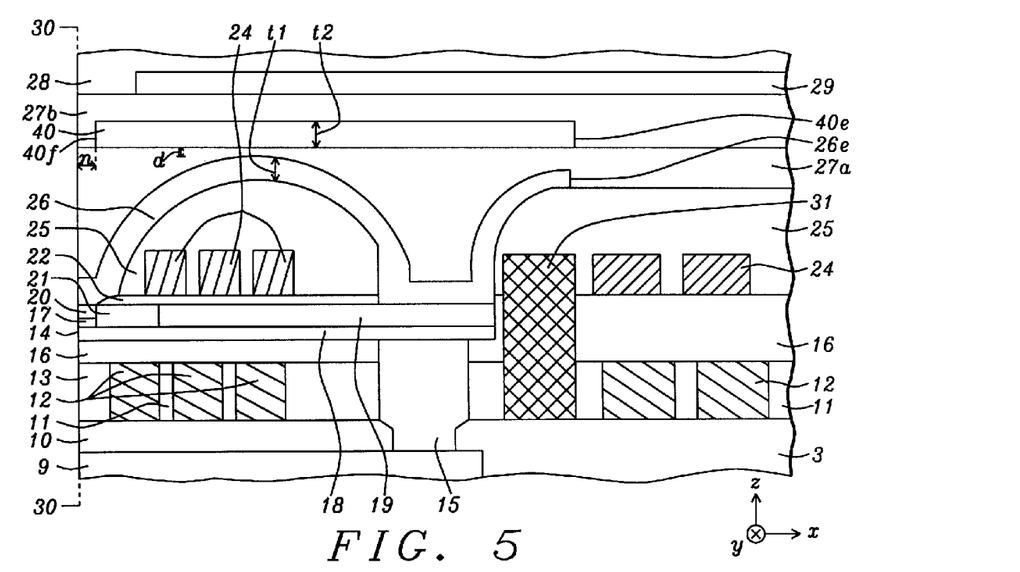
FIG. 5 is a cross-sectional view of a PMR writer that has a flat recessed umbrella shield according to a fourth embodiment of the present disclosure.

In a fourth embodiment shown in FIG. 5, there is a flat umbrella shield structure formed in a write head above PP3 similar to FIG. 4 except the front side 40f is recessed a distance n from the ABS. After the UmS is formed, insulation layer 27b is deposited on layers 27a, 40 as in the previous embodiments.

Figure 6:
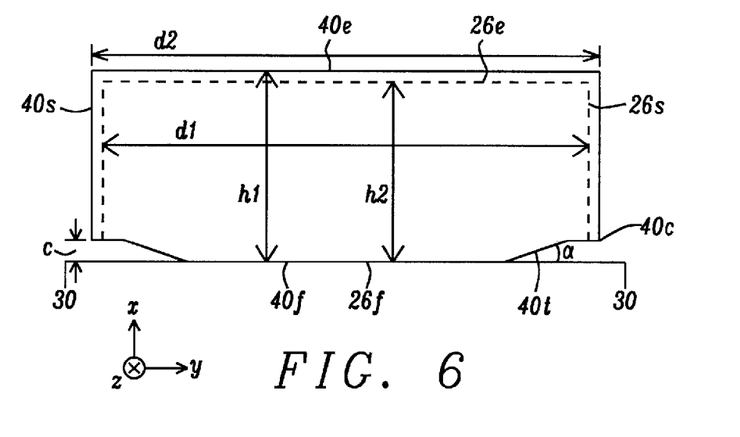
FIG. 6 is a top-down view showing an umbrella shield that is exposed at an ABS and overlays on a PP3 shield according to an embodiment of the present disclosure.

Referring to FIG. 6, a top-down view of an exposed umbrella shield design is shown with overlying layers removed. A dashed line for the underlying PP3 shield indicates the overlay of UmS on PP3. According to one embodiment, both of UmS and PP3 have a substantially rectangular shape with a front side 40f and 26f, respectively, along the ABS 30-30. There are two orthogonal sides 40s that connect the front side 40f to a back side 40e wherein the back side is parallel to the ABS. Likewise for PP3, two orthogonal sides 26s connect the front side to a back side 26e. Furthermore, there may be two tapered sides 40t where a tapered side is between an end of front side 40f and an end 40c of orthogonal side 40s where each end (corner) 40c is a recessed a certain distance c from the ABS. Each tapered side forms a so-called EFR cut angle α of about 8 to 15 degrees with respect to the ABS. Preferably, the distance h1 between the ABS and back side 40e is from 1 to 5 microns greater than the distance h2 between the ABS and back side 26e. Similarly, the cross-track width dimension d2 between orthogonal sides 40s should be about 1 to 5 microns greater than the width d1 between orthogonal sides 26s. The UmS/PP3 overlay described herein allows the UmS structure to completely overlap all sides of PP3.

Figure 7:
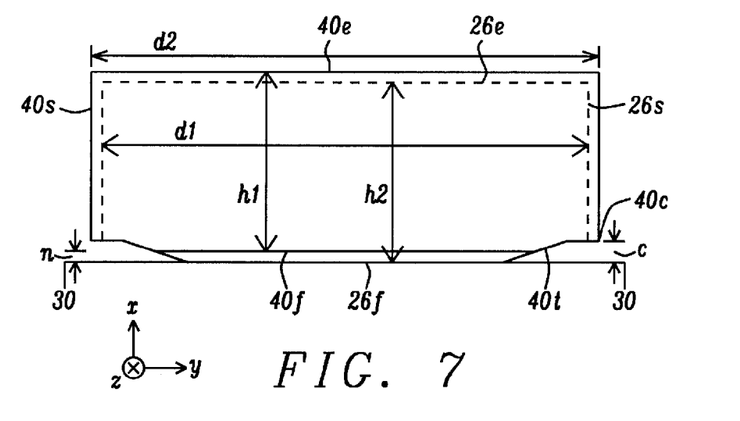
FIG. 7 is a top-down view showing a recessed umbrella shield that is overlaid on a PP3 shield according to an embodiment of the present disclosure.

With regard to FIG. 7, a top-down view of one embodiment of a recessed umbrella shield design is illustrated and shows the UmS overlay on a PP3 shield. In this case, all features from the previous embodiment are retained except the front side 40f of UmS is recessed a distance n from the ABS 30-30 and is formed parallel to the ABS. Again, there may be a tapered side 40t that connects each end of the front side 40f to an orthogonal side 40s where the intersection point 40c is a distance c from the ABS where c>n. The umbrella shield completely covers PP3 except for a small portion of PP3 along the ABS at front side 26f and extending a distance n toward the back side 26e.

Figure 8:
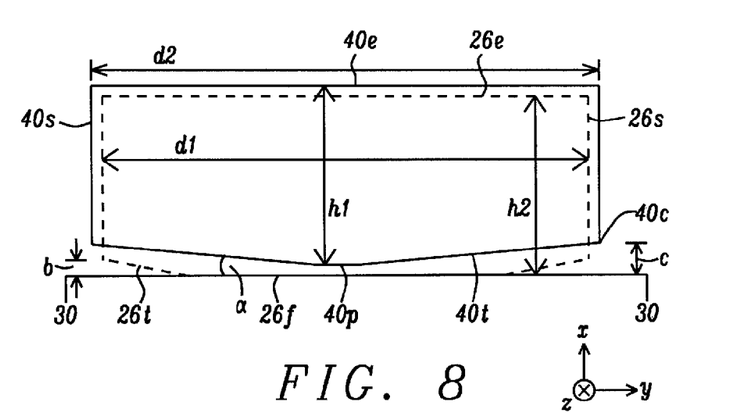
FIG. 8 is a top-down view of a recessed umbrella shield with a tapered front end according to an embodiment of the present disclosure.

In FIG. 8, another recessed umbrella shield design of the present disclosure is shown that incorporates an angle along a front portion facing the ABS. Thus, front side 40f is replaced by two tapered sides 40t that extend from an orthogonal side 40s at corner 40c to a center point 40p that is recessed a distance n from the ABS 30-30. The center point is so named since point 40p is preferably an equal distance from each orthogonal side 40s. Each tapered side forms an angle α of about 0.1 to 20 degrees, and preferably 8 to 15 degrees, with the ABS. In this embodiment, UmS completely covers PP3 except for a portion of PP3 between a tapered side 40t and a tapered side 26t, and a portion of PP3 between tapered side 40t and front side 26f. Note that each tapered side 26t extends from an end of front side 26f to an end of orthogonal side 26s at corner 26c where the corner is a distance b from the ABS such that c>b>n where c is the distance between corner 40c and the ABS.

Figure 9:
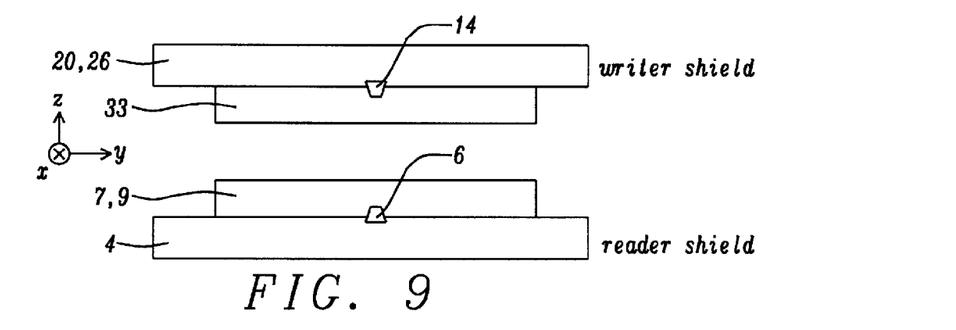
FIG. 9, FIG. 11, and FIG. 13 are ABS views of combined read/write head structures showing various designs of writer shields and reader shields.

Referring to FIG. 9, an ABS view of one embodiment of a shield structure in a combined read head/write head fabricated by the inventors is shown wherein writer shields surround the write pole 14 and reader shields surround the sensor 6. The upper write shield represents trailing shields 20, 26 while the lower write shield 33 is a combination of a leading shield and side shields. The upper (S2) reader shield is a combination of shield layers 7, 9 described previously while lower (S1) reader shield is shield layer 4 as found in FIG. 1. In this particular embodiment, the upper write shield and S1 reader shield have a first width in a cross-track direction along the y-axis. Lower write shield and S2 reader shield have a second width that is less than the first width.

Referring to FIG. 10a, one embodiment of the present disclosure includes an umbrella shield 40 formed above the writer shield structure of FIG. 9. An important feature is that the cross-track width d2 of the umbrella shield is greater than the first width and greater than the second width of the writer shield and reader shield layers. Note that UmS 40 is aligned to completely cover trailing shields 20, 26 from a down-track perspective along the z-axis direction. The embodiment depicted in FIG. 10b retains the same features found in FIG. 10a except the umbrella shield is recessed as indicated by the dashed line.

Figure 11:
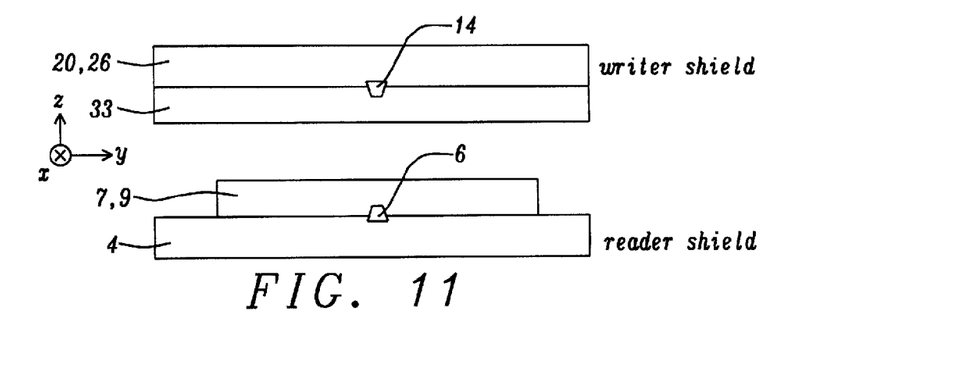

In FIG. 11, an ABS view of a second embodiment of a shield structure in a combined read head/write head fabricated by the inventors is shown wherein the upper and lower write shields as well as the S1 reader shield have a first width in a cross-track direction along the y-axis. The S2 reader shield has a second width that is less than the first width.

Referring to FIG. 12a, another embodiment of the present disclosure includes an umbrella shield 40 formed above the writer shield structure of FIG. 11. An important feature is that the cross-track width d2 of the umbrella shield is greater than both of the first width and second width. Again, UmS 40 is aligned to completely cover trailing shields 20, 26 from a down-track perspective along the z-axis direction. The embodiment depicted in FIG. 12b retains the same features found in FIG. 12a except the umbrella shield is recessed behind the ABS.

Figure 13:
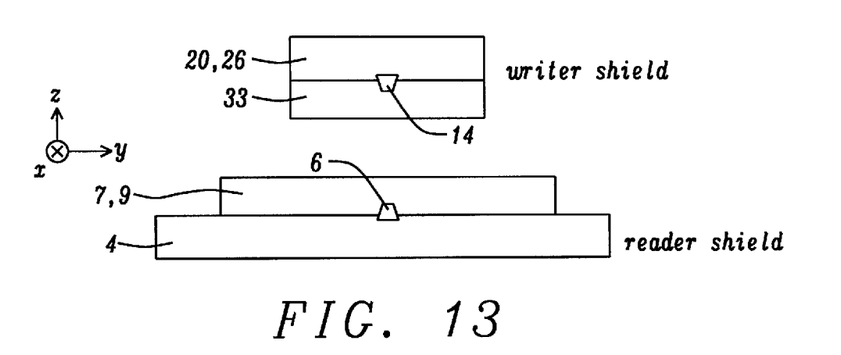

Referring to FIG. 13, an ABS view of a third embodiment of a shield structure in a combined read head/write head fabricated by the inventors is shown wherein the S1 reader shield has a first width in a cross-track direction, the S2 reader shield has a second width that is less than the first width, and the writer shields have a third width less than the second width.

Referring to FIG. 14a, another embodiment of the present disclosure includes an umbrella shield 40 formed above the writer shield structure of FIG. 13. An important feature is that the cross-track width d2 of the umbrella shield is greater than the first width, second width, and third width. Furthermore, UmS 40 is aligned to completely cover trailing shields 20, 26 from a down-track perspective. The embodiment depicted in FIG. 14b retains the same features found in FIG. 14a except the umbrella shield is recessed behind the ABS.

Figure 15:
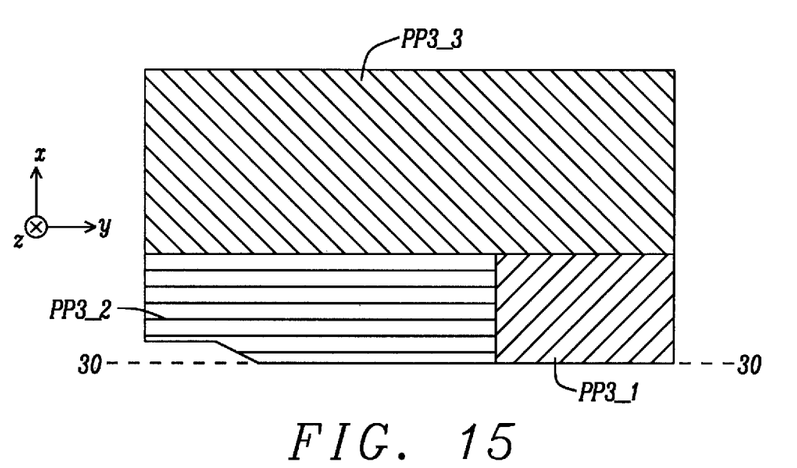
FIG. 15 is an top-down view of a PP3 shield showing three sections used in a modeling experiment to determine B volume average.

In order to determine the effectiveness of an umbrella shield in improving stray field robustness, a simulation was performed to obtain B volume average at various locations in the PP3 shield as a function of umbrella shield design. For this experiment, PP3 is separated into three sections that are illustrated in FIG. 15 to calculate volume average of magnetic flux density (B volume average) in each section. A first section (PP3_1) is considered the most significant PP3 part for head performance since it lies directly over the main pole layer and write pole at the ABS. PP3_1 extends about 4 microns in a cross-track (y-axis) direction where it adjoins a second (PP3_2) section. PP3_1 and PP3_2 extend towards a back end of the PMR head and each section adjoins a back section (PP3_3) behind the PP3 arch (not shown) along a plane that is about 4 microns from the ABS.

Figure 16:
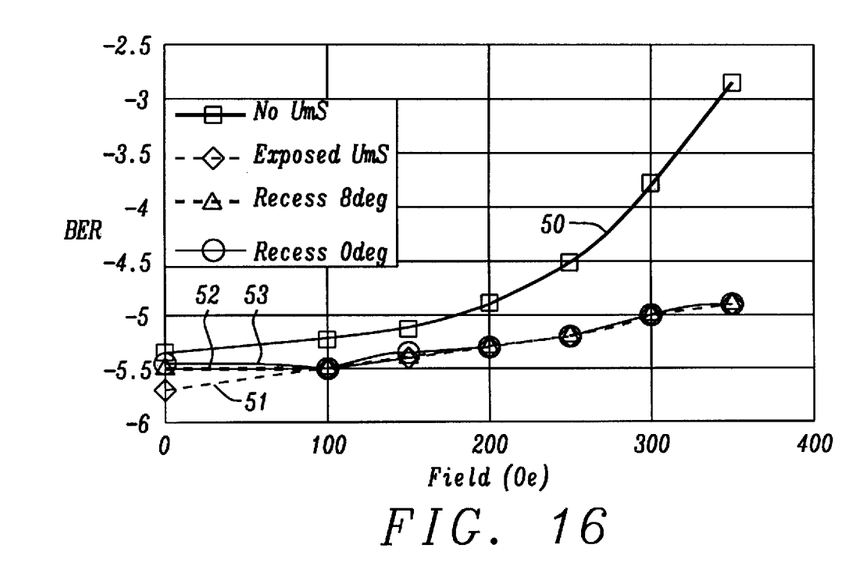
FIG. 16 is a graph of bit error rate as a function of external magnetic field for a reference write head and for writers with three umbrella shield designs.

Referring to FIG. 16, a plot of bit error rate vs. external magnetic field is illustrated for the shield designs in Table 1. Therefore, the reference (curve 50) corresponds to row 1 (no UmS); curve 51 is an exposed UmS design (row 2); while curves 52 and 53 are associated with the UmS designs in row 3 and row 4, respectively. An improvement in BER is clearly observed for all UmS embodiments compared with the no UmS reference.

It should be understood that the UmS structures of the present disclosure can be fabricated by well known process steps that are not shown herein. With regard to the first embodiment depicted in FIG. 2, a standard process flow is followed through the completion of PP3 shield 26. Then, an insulation layer 27a is deposited that substantially conforms to the top surface of PP3. Thereafter, a photoresist layer (not shown) is formed on layer 27a and has an opening that corresponds to the desired shape and dimensions of the subsequently deposited UmS layer. A seed layer may be formed in the opening before the UmS shield 40 is deposited by a plating technique. Optionally, a sputter deposition method is used. After the photoresist layer is removed, insulation layer 27b may be deposited on UmS 40 and on insulation layer 27a. A CMP process may be employed to form a flat top surface on insulation layer 27b before completing the write head fabrication. When a flat UmS is desired, insulation layer 27a is deposited to a certain thickness above PP3 and a planar top surface is achieved with a CMP process. Then the photoresist patterning and UmS deposition steps previously described are used. A second CMP process may be applied following UmS deposition to form a flat top surface before insulation layer 27b is deposited.

We have discovered that insertion of an umbrella shield (UmS) in an insulation layer above a PP3 trailing shield in a write head structure enables a significant improvement in

TABLE 1

Effectiveness of Umbrela Shield on SFR (400 Oe stray field into ABS direction)

| Design | Recess amt. | Rec. angle | PP3_1 B vol. | Red. (%) | PP3_2 B vol. | Red. (%) | PP3_3 B vol. | Red. (%) |
|---|---|---|---|---|---|---|---|---|
| No UmS | NA | NA | 0.59 | NA | 0.68 | NA | 0.78 | NA |
| UmS-exposed | 0 um | NA | 0.38 | 36% | 0.42 | 38% | 0.44 | 44% |
| UmS-recessed | 0.5 um | 0 deg. | 0.41 | 31% | 0.45 | 34% | 0.44 | 44% |
| UmS-recessed | 0.5 um | 8 deg. | 0.47 | 20% | 0.57 | 16% | 0.50 | 36% |

The modeling results are found in Table 1 and indicate that an exposed umbrella shape structure (row 2) previously described with respect to FIG. 6 offers the most reduction in stray field induced performance. Row 3 corresponds to a UmS structure shown in FIG. 7 where there is a recessed front side formed parallel to the ABS. Row 4 is represented by the UmS design in FIG. 8 where tapered front sides are each formed at an angle of 8 degrees with respect to the ABS and converge at a center point that is recessed from the ABS by 0.5 microns. Row 3 provides slightly less stray field reduction than for an exposed UmS (row 2). Row 4 has the least amount of stray field reduction presumably because the UmS design in FIG. 8 leaves a larger portion of PP3 uncovered from a top-down view than the UmS shapes in FIG. 6 and FIG. 7. Although the modeling applies to a conformal UmS shape for structures in row 2-4, a similar outcome is expected for a flat UmS design. In this experiment, UmS has a thickness of 1 micron while PP3 thickness is 0.7 microns. Composition is NiFe 10 kG for UmS and NiFe 16 kG for PP3. UmS height (h1) shown in FIGS. 6-8 is 15 microns, PP3 height (h2) is 14 microns, UmS width d2 is 46 microns, and PP3 width d1 is 44 microns.

stray field robustness and external field robustness when the UmS substantially covers a top surface of PP3 from a down-track perspective. Furthermore, bit error rate is reduced with either of an exposed or recessed UmS design wherein the recessed design has flexibility to incorporate an angled front side proximate to the ABS. A UmS also enables a flatter protrusion profile for the write head that leads to better touch down detection and improved reliability for narrow writer designs.

While the present disclosure has been particularly shown and described with reference to, the preferred embodiment thereof, it will be understood by those skilled in the art that various changes in form and details may be made without departing from the spirit and scope of this disclosure.

We claim:

1. A trailing shield structure in a combined read head/write head; comprising:
   (a) a first trailing shield layer formed along an air bearing surface (ABS) and having a bottom surface that is separated from a write pole portion of a main pole layer by a write gap;

(b) a second trailing shield layer (PP3) with a front side at the ABS, and a first width between two sides that are formed orthogonal to the ABS, PP3 has a first thickness in a down-track direction and contacts a top surface of the first trailing shield layer along the ABS, and extends with an arch shape to a back side that is a first length from the ABS, PP3 contacts a yoke portion of the main pole layer at a yoke length from the ABS; and (c) an umbrella shield (UmS) that is a magnetic layer formed above PP3 and substantially conforms to a shape of PP3 wherein UmS has a second width in a cross-track direction between two sides that are formed orthogonal to the ABS, the second width is greater than the first width, a second thickness in a down-track direction that is greater than the first thickness, and UmS extends for a second length from a front side to a back side such that the second length is greater than the first length.

2. The trailing shield structure of claim 1 wherein the front side of the UmS adjoins the ABS in an exposed umbrella shield design.

3. The trailing shield structure of claim 1 wherein the front side of the umbrella shield is recessed from the ABS by a distance of about 0.2 to 1.5 microns.

4. The trailing shield structure of claim 1 wherein the second thickness is about 1.1 to 3 times larger than the first thickness, and each of the second width and second length is about 1 to 5 microns greater than the first width and first length, respectively.

5. The trailing shield structure of claim 1 wherein an insulation layer with a thickness of at least 0.3 microns separates PP3 and the umbrella shield.

6. The trailing shield structure of claim 1 wherein the second width is greater than any other shield width in either of the read head and write head.

7. The trailing shield structure of claim 1 wherein the umbrella shield is made of NiFe, CoFe, or CoFeNi.

8. The trailing shield structure of claim 3 further comprised of two tapered sides on the UmS layer, each tapered side connects an end of the UmS front side to an end of a UmS orthogonal side to form a corner that is recessed a third distance from the ABS wherein the third distance is greater than the recessed distance.

9. The trailing shield structure of claim 1 wherein the front side of UmS is comprised of two tapered sides wherein the tapered sides converge at a point that is recessed from the ABS by a distance of 0.2 to 1.5 microns, and each tapered side forms an angle with respect to the ABS and terminates at an end of one of the UmS orthogonal sides.

10. The trailing shield structure of claim 9 wherein the angle is between about 0.1 and 20 degrees.

11. A trailing shield structure in a combined read head/write head; comprising:

(a) a first trailing shield layer formed along an air bearing surface (ABS) and having a bottom surface that is separated from a write pole portion of a main pole layer by a write gap;

(b) a second trailing shield layer (PP3) with a front side at the ABS, and a first width between two sides that are formed orthogonal to the ABS, PP3 has a first thickness in a down-track direction and contacts a top surface of the first trailing shield layer along the ABS, and extends with an arch shape to a back side that is a first length from the ABS, PP3 contacts a yoke portion of the main pole layer at a yoke length from the ABS; and (c) an umbrella shield (UmS) that is a flat magnetic layer formed above PP3 wherein UmS has a second width in a cross-track direction between two sides that are formed orthogonal to the ABS, the second width is greater than the first width, a second thickness in a down-track direction that is greater than the first thickness, and UmS extends for a second length from a front side to a back side in a direction perpendicular to the ABS such that the second length is greater than the first length.

12. The trailing shield structure of claim 11 wherein the front side of the UmS adjoins the ABS in an exposed umbrella shield design.

13. The trailing shield structure of claim 11 wherein the front side of the umbrella shield is recessed from the ABS by a distance of about 0.2 to 1.5 microns.

14. The trailing shield structure of claim 11 wherein the second thickness is about 1.1 to 3 times larger than the first thickness, and each of the second width and second length is about 1 to 5 microns greater than the first width and first length, respectively.

15. The trailing shield structure of claim 11 wherein an insulation layer with a thickness of at least 0.3 microns separates PP3 and the umbrella shield.

16. The trailing shield structure of claim 11 wherein the second width is greater than any other shield width in either of the read head and write head.

17. The trailing shield structure of claim 11 wherein the umbrella shield is made of NiFe, CoFe, or CoFeNi.

18. The trailing shield structure of claim 13 further comprised of two tapered sides on the UmS layer, each tapered side connects an end of the UmS front side to an end of a UmS orthogonal side to form a corner that is recessed a third distance from the ABS wherein the third distance is greater than the recessed distance.

19. The trailing shield structure of claim 11 wherein the front side of UmS is comprised of two tapered sides wherein the tapered sides converge at a point that is recessed from the ABS by a distance of 0.2 to 1.5 microns, and each tapered side forms an angle with respect to the ABS and terminates at an end of one of the UmS orthogonal sides.

20. The trailing shield structure of claim 19 wherein the angle is between about 0.1 and 20 degrees.

21. A method of forming a trailing shield structure in a combined read head/write head; comprising:

(a) providing a main pole layer having a write pole, and a write gap formed on the write pole;

(b) forming a first trailing shield on the write gap;

(c) forming a second trailing shield layer (PP3) with a front side that contacts a top surface of the first trailing shield and is aligned above a front surface of the write pole, PP3 has a first width in a cross-track direction between two sides that are formed orthogonal to the front side, a first thickness in a down-track direction, and extends with an arch shape to a back side that is a first length from the front side, PP3 contacts a yoke portion of the main pole layer at a yoke length from the write pole's front surface;

(d) depositing a first insulation layer on the second trailing shield layer; and (e) forming an umbrella shield (UmS) that is a magnetic layer formed on the first insulation layer and aligned above PP3, UmS substantially conforms to a shape of PP3 wherein UmS has a front side and a second width in a cross-track direction between two sides that are formed orthogonal to the UmS front side, the second width is greater than the first width, a second thickness in a down-track direction that is greater than the first thickness, and UmS extends for a second length from a front side to a back side such that the second length is greater than the first length.

22. The method of claim 21 further comprised of lapping the combined read head/write head including the trailing shield structure to form an air bearing surface (ABS) proximate to the front surface of the write pole and proximate to the front sides of the second trailing shield and UmS shield.

23. The method of claim 22 wherein the PP3 front side and the front side of the UmS adjoin the ABS in an exposed umbrella shield design.

24. The method of claim 22 wherein the front side of the umbrella shield is recessed from the ABS by a distance of about 0.2 to 1.5 microns.

25. The method of claim 22 wherein the second thickness is about 1.1 to 3 times larger than the first thickness, and each of the second width and second length is about 1 to 5 microns greater than the first width and first length, respectively.

26. The method of claim 21 wherein the insulation layer has a thickness of at least 0.3 microns.

27. The method of claim 21 wherein the second width is greater than any other shield width in either of the read head and write head.

28. The method of claim 22 wherein the front side of UmS is comprised of two tapered sides wherein the tapered sides converge at a point that is recessed from the ABS by a distance of 0.2 to 1.5 microns, and each tapered side forms an angle with respect to the ABS and terminates at an end of one of the UmS orthogonal sides.

29. The method of claim 28 wherein the angle is between about 0.1 and 20 degrees.

\* \* \* \* \*